US012613324B2

(12) United States Patent
Wakita et al.

(10) Patent No.: US 12,613,324 B2
(45) Date of Patent: Apr. 28, 2026

(54) OBJECT DETECTION DEVICE, OBJECT DETECTION METHOD, AND PROGRAM

(71) Applicant: AISIN CORPORATION, Kariya (JP)

(72) Inventors: Kosuke Wakita, Kariya (JP); Ippei Sugae, Kariya (JP)

(73) Assignee: AISIN CORPORATION, Kariya (JP)

( * ) Notice: Subject to any disclaimer, the term of this patent is extended or adjusted under 35 U.S.C. 154(b) by 133 days.

(21) Appl. No.: 18/289,821

(22) PCT Filed: Jul. 5, 2022

(86) PCT No.: PCT/JP2022/026740
§ 371 (c)(1),
(2) Date: Nov. 7, 2023

(87) PCT Pub. No.: WO2023/282265
PCT Pub. Date: Jan. 12, 2023

(65) Prior Publication Data
US 2024/0241240 A1     Jul. 18, 2024

(30) Foreign Application Priority Data

Jul. 9, 2021     (JP) ................................. 2021-114122

(51) Int. Cl.
*G01S 15/04* (2006.01)
*G01S 7/539* (2006.01)
*G01S 15/931* (2020.01)

(52) U.S. Cl.
CPC .............. *G01S 7/539* (2013.01); *G01S 15/04* (2013.01); *G01S 15/931* (2013.01)

(58) Field of Classification Search
CPC .......... G01S 7/539; G01S 15/04; G01S 15/02; G01S 15/54; G01S 15/874; G01H 5/00
See application file for complete search history.

(56) References Cited

U.S. PATENT DOCUMENTS

2002/0047780 A1     4/2002  Nishimoto et al.
2008/0247275 A1*   10/2008  Dubuis .................. H04B 11/00
                                                           367/131

FOREIGN PATENT DOCUMENTS

DE     102016122427 A1 *  5/2018  .............. G01H 5/00
JP        05-223928 A      9/1993
(Continued)

OTHER PUBLICATIONS

Extended European Search Report dated Oct. 17, 2024 from the European Patent Office in Application No. 22837679.4.
(Continued)

*Primary Examiner* — Benyam Haile
(74) *Attorney, Agent, or Firm* — Sughrue Mion, PLLC

(57)     ABSTRACT

An object detection device includes an acquisition unit that acquires intensity of a direct wave at a second transmission and reception unit among a plurality of transmission and reception units that allow transmission and reception of an ultrasonic wave, the direct wave directly received by the second transmission and reception unit and being an ultrasonic wave transmitted by a first transmission and reception unit among the plurality of transmission and reception units. An intensity of a reflected wave received by the transmission and reception unit, the reflected wave being a reflected wave obtained by the ultrasonic wave transmitted from the first transmission and reception unit reflected on an object, and a detection unit that calculates an air-absorption attenuation coefficient of the ultrasonic wave on the basis of the intensity of the direct wave to detects the object on the basis of the air-absorption attenuation coefficient and the intensity of the reflected wave.

9 Claims, 10 Drawing Sheets

(56)        References Cited

FOREIGN PATENT DOCUMENTS

| JP | 2002-131417 A | 5/2002 |
| JP | 2002-131428 A | 5/2002 |
| WO | 2016/063530 A1 | 4/2016 |

OTHER PUBLICATIONS

International Search Report for PCT/JP2022/026740 dated Aug. 30, 2022 (PCT/ISA/210).

* cited by examiner

| Intensity of direct wave (A) | A1 (Low) | A2 | A3 (Reference) | A4 | A5 (High) |
|---|---|---|---|---|---|
| Air-absorption attenuation coefficient (E) | E5 | E4 | E3 | E2 | E1 |

| Air-absorption attenuation coefficient | E1 (Low) | E2 | E3 (Reference) | E4 | E5 (High) |
|---|---|---|---|---|---|
| Reflected-wave threshold value (Th1) | Thb | Thb | Tha | Thc | Thc |

OBJECT DETECTION DEVICE, OBJECT DETECTION METHOD, AND PROGRAM

CROSS REFERENCE TO RELATED APPLICATIONS

This application is a National Stage of International Application No. PCT/JP2022/026740, filed Jul. 5, 2022, claiming priority to Japanese Patent Application No. 2021-114122, filed Jul. 9, 2021, the entire contents of which are incorporated in their entirety.

TECHNICAL FIELD

The present disclosure relates to an object detection device, an object detection method, and a program.

BACKGROUND ART

Conventionally, there has been known an object detection device that detects an object present around a vehicle, on the basis of a result of transmission and reception of ultrasonic waves with an ultrasonic sensor mounted on the vehicle.

CITATIONS LIST

Patent Literature

Patent Literature 1: JP 2002-131417 A
Patent Literature 2: JP 2002-131428 A

SUMMARY OF THE DISCLOSURE

Technical Problems

The ultrasonic waves attenuate while propagating in air, and the attenuation of the ultrasonic wave varies depending on an air state (air temperature or humidity). Therefore, accuracy of detection of the object by the object detection device may change by being affected by the air state.

Accordingly, one of aims of the present disclosure is to obtain an object detection device, an object detection method, and a program that allow accuracy of detection of an object to be less affected by an air state.

Solutions to Problems

An object detection device as an example of the present disclosure includes an acquisition unit that acquires intensity of a direct wave at a second transmission and reception unit among a plurality of transmission and reception units that allow transmission and reception of an ultrasonic wave, the direct wave being directly received by the second the transmission and reception unit and being an ultrasonic wave transmitted by a first transmission and reception unit among the plurality of transmission and reception units, and intensity of the reflected wave received by the transmission and reception unit, the reflected wave being a reflected wave obtained by the ultrasonic wave transmitted from the first the transmission and reception unit being reflected on an object, and a detection unit that calculates an air-absorption attenuation coefficient of the ultrasonic wave on the basis of the intensity of the direct wave, and detects the object on the basis of the air-absorption attenuation coefficient and the intensity of the reflected wave.

According to such a configuration, the air-absorption attenuation coefficient of the ultrasonic wave is calculated, and the object is detected on the basis of the air-absorption attenuation coefficient and the intensity of the reflected wave, thereby allowing accuracy of detection of the object to be less affected by an air state.

In the object detection device, for example, the detection unit acquires a first threshold value corresponding to the air-absorption attenuation coefficient, and, in a case where the intensity of the reflected wave is equal to or greater than the first threshold value, determines that the object is present.

According to such a configuration, the first threshold value is a value corresponding to the air-absorption attenuation coefficient, and thus, the accuracy of detection of the object is improved as compared with a case where the first threshold value is a fixed value.

The object detection device includes, for example, the plurality of transmission and reception units, and each of the plurality of transmission and reception units include a vibrator that performs both transmission of the ultrasonic wave and reception of the ultrasonic wave.

According to such a configuration, the transmission and reception units can be simplified as compared with a configuration in which a vibrator that transmits an ultrasonic wave and a vibrator that receives an ultrasonic wave are separate in the transmission and reception units.

In the object detection device, for example, the acquisition unit acquires the intensity of the direct wave for each of the plurality of the transmission and reception units, and the detection unit calculates an average value of the intensities of a plurality of the direct waves, and calculates the air-absorption attenuation coefficient on the basis of the average value.

According to such a configuration, it is possible to reduce chances of occurrence of variations in accuracy in the detection of the object.

In the object detection device, for example, the second the transmission and reception unit is positioned adjacent to the first the transmission and reception unit.

According to such a configuration, a distance between the first transmission and reception unit and the second transmission and reception unit can be relatively short, and thus, a path of a direct wave can be ensured relatively easily.

In the object detection device, for example, three or more the transmission and reception units are provided, and the second the transmission and reception unit is other than the transmission and reception unit closest to the first the transmission and reception unit among the plurality of the transmission and reception units.

According to such a configuration, a distance between the first transmission and reception unit and the second transmission and reception unit is long as compared with a configuration in which the second transmission and reception unit is the transmission and reception unit closest to the first transmission and reception unit among the plurality of transmission and reception units, and thus, an effect of air on intensity of a direct wave tends to be greater. Therefore, accuracy in calculation of an air-absorption attenuation coefficient can be improved.

In the object detection device, for example, in a case where the intensity of the direct wave is equal to or less than a second threshold value, the detection unit does not determine whether or not the object is present, and the second threshold value is not changed even if the air-absorption attenuation coefficient is changed.

According to such a configuration, whether or not the object is present is not determined in a case where the intensity of the direct wave is equal to or less than the second threshold value, and thus, the object is not erroneously detected in a case where the intensity of the direct wave is a relatively weak, being equal to or less than the second threshold value.

An object detection method as an example of the present disclosure is an object detection method executed in an object detection device, the object detection method including a step of acquiring intensity of a direct wave at a second transmission and reception unit among a plurality of transmission and reception units that allow transmission and reception of an ultrasonic wave, the direct wave being directly received by the second the transmission and reception unit and being an ultrasonic wave transmitted by a first transmission and reception unit among the plurality of transmission and reception units, and intensity of the reflected wave received by the transmission and reception unit, the reflected wave being a reflected wave obtained by the ultrasonic wave transmitted from the first the transmission and reception unit being reflected on an object, and a step of calculating an air-absorption attenuation coefficient of the ultrasonic wave on the basis of the intensity of the direct wave, and detecting the object on the basis of the air-absorption attenuation coefficient and the intensity of the reflected wave.

According to such a configuration, the air-absorption attenuation coefficient of the ultrasonic wave is calculated, and the object is detected on the basis of the air-absorption attenuation coefficient and the intensity of the reflected wave, thereby allowing accuracy of detection of the object to be less affected by an air state.

A program as an example of the present disclosure causes a computer to function as an acquisition unit that acquires intensity of a direct wave at a second transmission and reception unit among a plurality of transmission and reception units that allow transmission and reception of an ultrasonic wave, the direct wave being directly received by the second the transmission and reception unit and being an ultrasonic wave transmitted by a first transmission and reception unit among the plurality of transmission and reception units, and intensity of the reflected wave received by the transmission and reception unit, the reflected wave being a reflected wave obtained by the ultrasonic wave transmitted from the first the transmission and reception unit being reflected on an object, and a detection unit that calculates an air-absorption attenuation coefficient of the ultrasonic wave on the basis of the intensity of the direct wave, and detects the object on the basis of the air-absorption attenuation coefficient and the intensity of the reflected wave.

According to such a configuration, the air-absorption attenuation coefficient of the ultrasonic wave is calculated, and the object is detected on the basis of the air-absorption attenuation coefficient and the intensity of the reflected wave, thereby allowing accuracy of detection of the object to be less affected by an air state.

DESCRIPTION OF EMBODIMENTS

Hereinafter, an embodiment of the present disclosure will be described with reference to the drawings. The configurations of the embodiment described below and functions and effects brought about by the configurations are merely an example, and the present disclosure is not limited to the following description.

Figure 1:
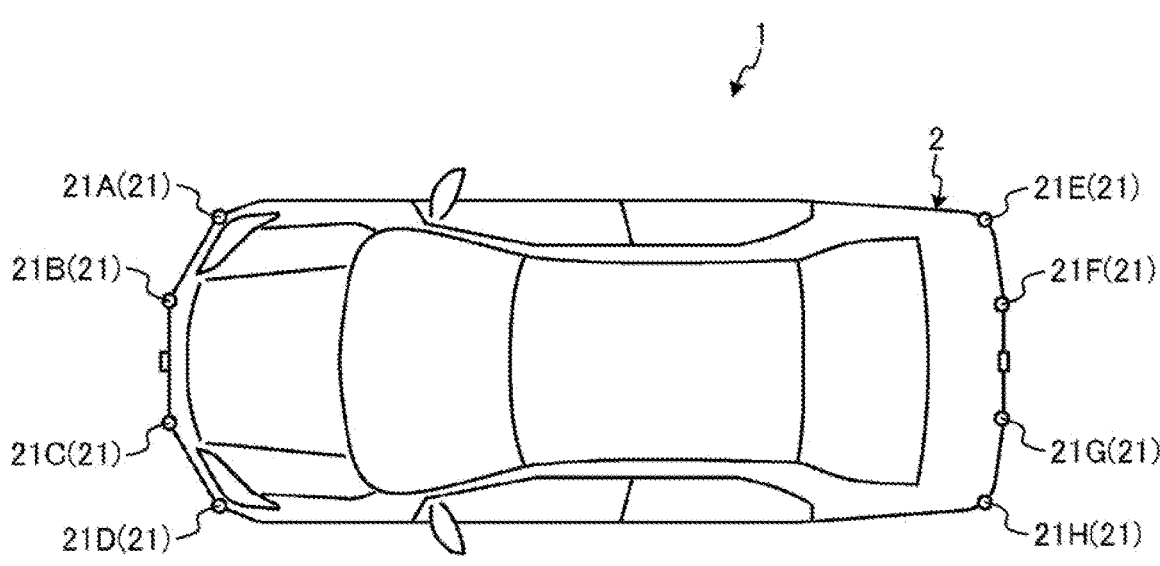
FIG. 1 is a top view showing an example of a configuration of a vehicle according to an embodiment.

FIG. 1 is a top view showing an example of a configuration of a vehicle 1 according to an embodiment. The vehicle 1 is an example of a vehicle on which an object detection device according to the present embodiment is mounted. The object detection device according to the present embodiment is a device that detects an object present around the vehicle 1, on the basis of time of flight (TOF), Doppler shift information, or the like acquired by transmitting an ultrasonic wave from the vehicle 1 and receiving a reflected wave from the object.

The object detection device according to the present embodiment includes a plurality of transmission and reception units 21A to 21H (hereinafter, abbreviated as a transmission and reception unit 21 in a case where it is not necessary to distinguish the plurality of transmission and reception units 21A to 21H). Each of the transmission and reception units 21 is installed on a vehicle body 2 as an exterior of the vehicle 1, transmits an ultrasonic wave (transmission wave) toward outside of the vehicle body 2, and receives a reflected wave from an object present outside the vehicle body 2. In the example shown in FIG. 1, a plurality of (four as an example) transmission and reception units 21A to 21D are disposed at a front-end portion of the vehicle body 2, and a plurality of (four as an example) transmission and reception units 21E to 21H are disposed at a rear-end portion. The plurality of transmission and reception units 21A to 21D are at different positions in a width direction of the vehicle 1. Further, the plurality of transmission and reception units 21E to 21H are at different positions in a width direction of the vehicle 1. Note that the number and installation positions of the transmission and reception units 21 are not limited to the above-described example.

Figure 2:
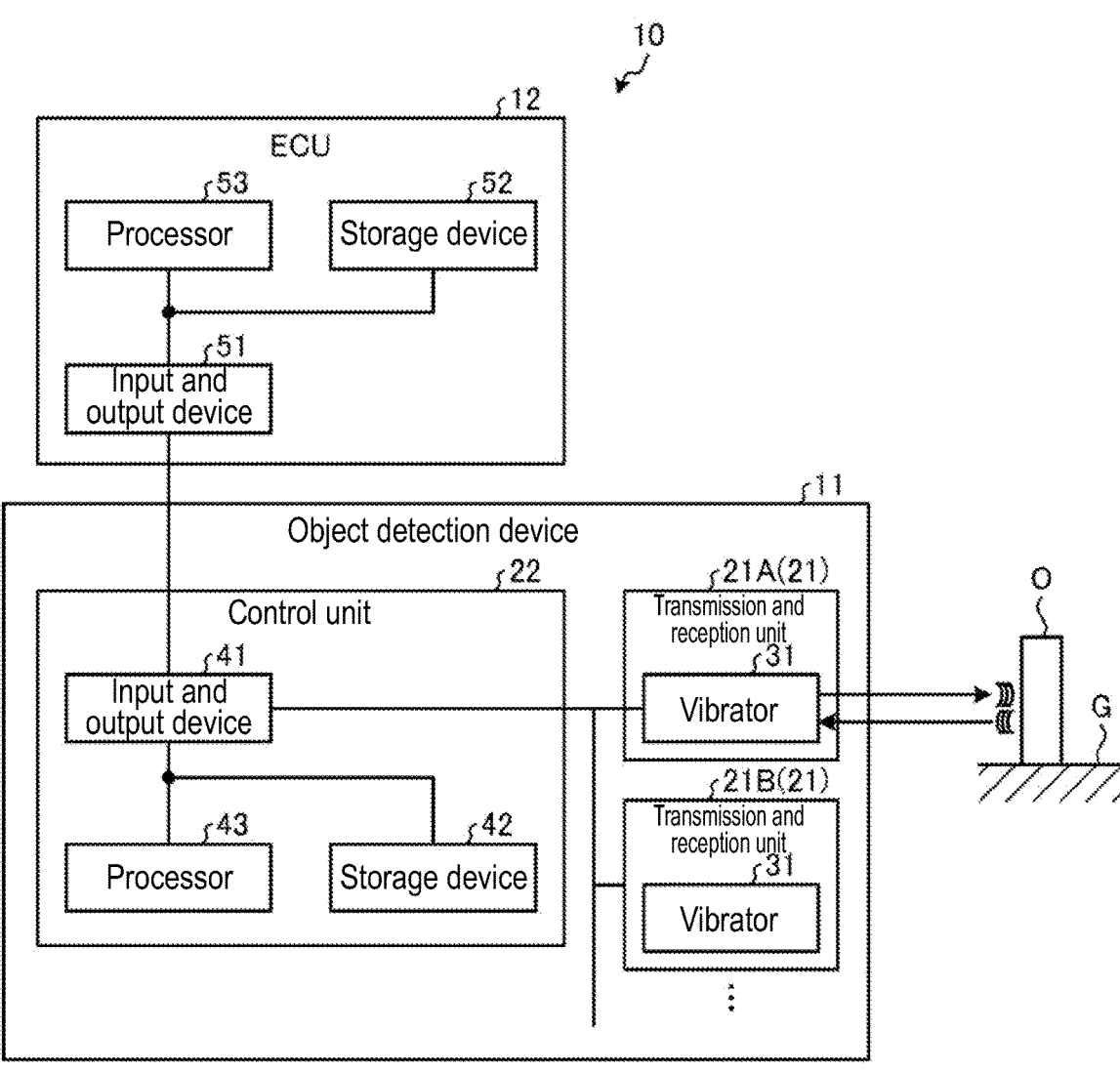
FIG. 2 is a block diagram showing an example of a configuration of a vehicle control device according to the embodiment.

FIG. 2 is a block diagram showing an example of a configuration of a vehicle control device 10 according to the embodiment. The vehicle control device 10 includes an object detection device 11 and an ECU 12. On the basis of information output from the object detection device 11, the vehicle control device 10 performs processing for controlling the vehicle 1.

The object detection device 11 includes the plurality of transmission and reception units 21 and a control unit 22. Each transmission and reception unit 21 includes a vibrator 31 configured utilizing a piezoelectric element or the like, an amplifier, and the like, and achieves transmission and reception of an ultrasonic wave with vibration of the vibrator 31. Specifically, each transmission and reception unit 21 transmits an ultrasonic wave, which is generated in response to vibration of the vibrator 31, as a transmission wave, and detects vibration of the vibrator 31 caused by a reflected wave obtained by the transmission wave being reflected by an object O. The object O includes an object O with which the vehicle 1 should avoid coming into contact and a road surface G on which the vehicle 1 travels. The vibration of the vibrator 31 is converted into an electric signal, and echo information indicating time-course changes in intensity (amplitude) of the reflected wave from an object O can be acquired on the basis of the electric signal. The TOF or the like corresponding to a distance from the transmission and reception units 21 (vehicle body 2) to the object O can be acquired on the basis of the echo information.

The echo information may be generated on the basis of data acquired by one transmission and reception unit 21, or may be generated on the basis of a plurality of pieces of data acquired by each of the plurality of transmission and reception units 21. For example, echo information about an object O present in front of the vehicle body 2 may be generated on the basis of two or more pieces of data (for example, an average value, or the like) acquired by two or more of the four transmission and reception units 21A to 21D disposed in front of the vehicle body 2 (refer to FIG. 1). Similarly, echo information about an object O present behind the vehicle body 2 may be generated on the basis of two or more pieces of data acquired by two or more of the four transmission and reception units 21E to 21H disposed behind the vehicle body 2 (refer to FIG. 1).

Note that, although there is exemplified a configuration in the example shown in FIG. 2 in which both transmission of a transmission wave and reception of a reflected wave are performed utilizing a single vibrator 31, the configuration of the transmission and reception unit 21 is not limited thereto. For example, as in a configuration in which a vibrator for transmitting a transmission wave and a vibrator for receiving a reflected wave are separately provided, a transmission side and a reception side may be separated.

The control unit 22 includes an input and output device 41, a storage device 42, and a processor 43. The input and output device 41 is an interface device for achieving transmission and reception of information between the control unit 22 and outside (the transmission and reception units 21, ECU 12, and the like). The storage device 42 includes a main storage device such as a read only memory (ROM) and a random access memory (RAM), and an auxiliary storage device such as a hard disk drive (HDD) and a solid state drive (SSD). The processor 43 is an integrated circuit that executes various kinds of processing for implementing functions of the control unit 22, and includes, for example, a central processing unit (CPU) that operates according to a program, an application specific integrated circuit (ASIC) designed for a specific application, and the like. The processor 43 executes various arithmetic processing and control processing by reading and executing a program stored in the storage device 42.

The ECU 12 is a unit that executes various kinds of processing for controlling the vehicle 1, on the basis of various kinds of information acquired from the object detection device 11 and the like. The ECU 12 includes an input and output device 51, a storage device 52, and a processor 53. The input and output device 51 is an interface device for achieving transmission and reception of information between the ECU 12 and an external mechanism (the object detection device 11, a drive mechanism, a braking mechanism, a steering mechanism, a transmission mechanism, an in-vehicle display, a speaker, and the like). The storage device 52 includes a main storage device such as a ROM and a RAM, and an auxiliary storage device such as an HDD and an SSD. The processor 53 is an integrated circuit that executes various kinds of processing for implementing functions of the ECU 12, and includes, for example, a CPU, an ASIC, and the like. The processor 53 executes various arithmetic processing and control processing by reading a program stored in the storage device 52.

Figure 3:
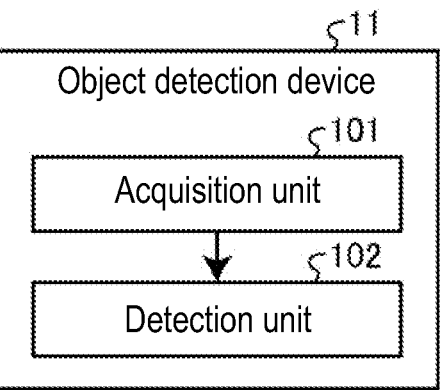
FIG. 3 is a block diagram showing an example of a functional configuration of an object detection device according to the embodiment.

FIG. 3 is a block diagram showing an example of a functional configuration of the object detection device 11 according to the embodiment. The object detection device 11 according to the present embodiment includes an acquisition unit 101 and a detection unit 102. These functional components 101 and 102 are implemented by cooperation of hardware components of the object detection device 11 exemplified in FIG. 2 and software components such as firmware and a program.

The acquisition unit 101 acquires various types of information. For example, the acquisition unit 101 processes data acquired by the transmission and reception unit 21 and generates various kinds of information. The acquisition unit 101 performs, for example, amplification processing, filter processing, line processing, or the like on an electrical signal corresponding to the vibration of the vibrator 31, and generates echo information indicating time-course changes in the intensity (amplitude) of the reflected wave transmitted by a transmission and reception unit 21 and reflected by the object. On the basis of the echo information, the TOF corresponding to an object O present around the vehicle 1 is detected, and a distance (hereinafter, also referred to as an object distance) from the transmission and reception unit 21 (vehicle body 2) to the object O is calculated, that is, acquired. The acquisition unit 101 acquires an object distance for each transmission and reception, which is transmission of a transmission wave and reception of a reflected wave by the transmission and reception unit 21. That is, the acquisition unit 101 can acquire an object distance a plurality of times.

Figure 4:
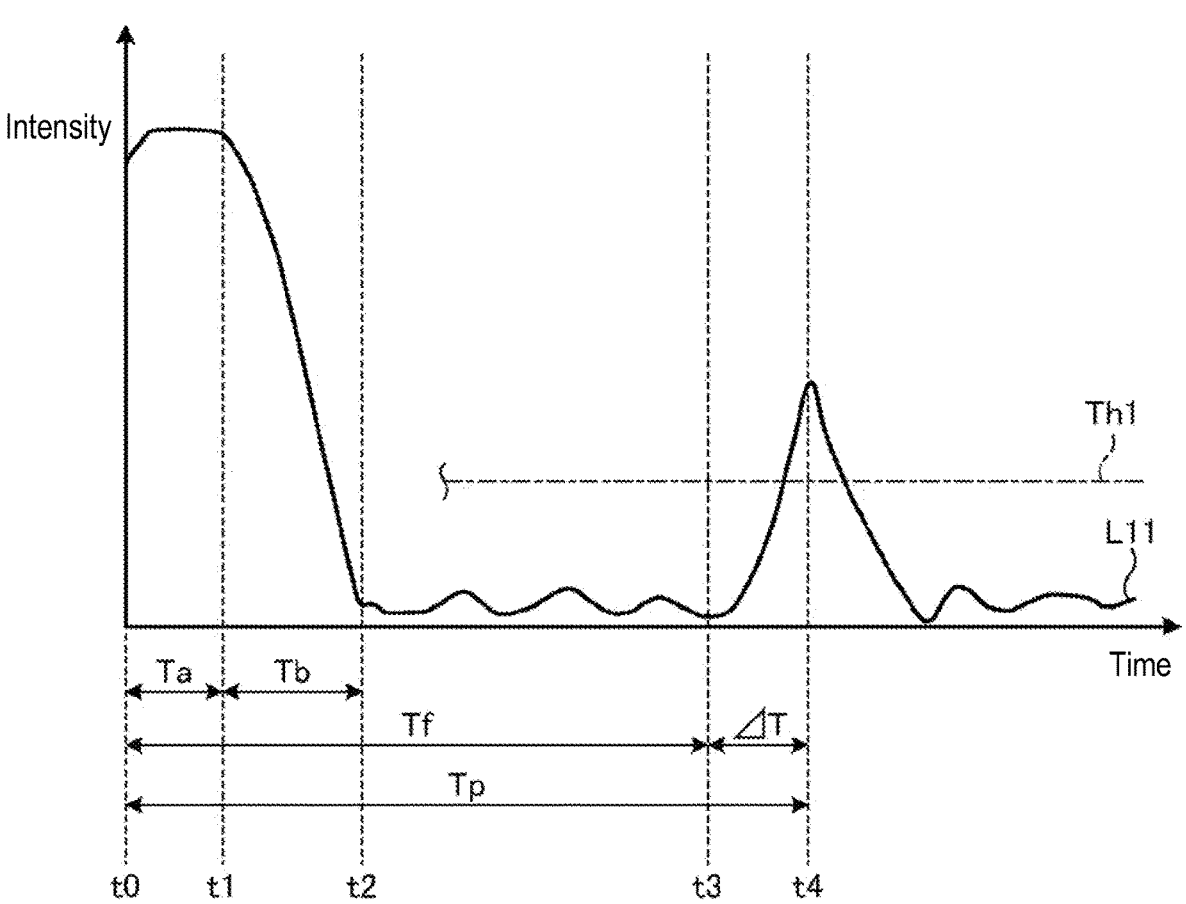
FIG. 4 is a diagram showing an example of echo information at a time of detection of an object in the embodiment.

FIG. 4 is a diagram showing an example of echo information at a time of detecting an object O in the embodiment. FIG. 4 exemplifies a line L11 as echo information indicating time-course changes in intensity of an ultrasonic wave transmitted and received by a transmission and reception unit 21. In the graph shown in FIG. 4, the horizontal axis corresponds to time (TOF), and the vertical axis corresponds to intensity (amplitude value) of an ultrasonic wave transmitted and received by the transmission and reception unit 21.

The line L11 indicates time-course changes in intensity indicating magnitude of vibration of the vibrator 31. It can be understood from the line L11 that the vibrator 31 is driven to vibrate from a timing to by a time Ta, by which transmission of the transmission wave is completed at a timing t1, and then the vibration of the vibrator 31 continues while attenuating during a time Tb until a timing t2. Therefore, in the graph shown in FIG. 4, the time Tb corresponds to a so-called reverberation time.

The line L11 reaches a peak at which the magnitude of the vibration of the vibrator 31 becomes equal to or greater than a reflected-wave threshold value Th1 at a timing t4 after a lapse of a time Tp from the timing to at which the transmission of the transmission wave is started. The reflected-wave threshold value Th1 is a value set to identify whether the vibration of the vibrator 31 is caused by reception of a reflected wave from an object O as a detection target (another vehicle, a structure, a pedestrian, or the like), or caused by reception of a reflected wave from an object other than the object O as a detection target (for example, the road surface G, or the like). Vibration having a peak equal to or greater than the reflected-wave threshold value Th1 can be regarded as being caused by reception of the reflected wave from the object O as the detection target. The reflected-wave threshold value Th1 is an example of a first threshold value.

The line L11 in this example indicates that the vibration of the vibrator 31 attenuates from the timing t4. Therefore, the timing t4 corresponds to a timing at which reception of the reflected wave from the object O is completed, in other words, a timing at which the transmission wave transmitted last at the timing t1 returns as a reflected wave.

Further, in the line L11, a timing t3 as a start point of the peak at timing t4 corresponds to a timing at which reception of the reflected wave from the object O starts, in other words, a timing at which a transmission wave first transmitted at the timing to returns as a reflected wave. Therefore, a time ΔT between the timing t3 and the timing t4 is equal to the time Ta as a transmission time of the transmission wave.

Thus, in order to obtain a distance from a transmission and reception source of an ultrasonic wave to the object O by utilizing the TOF, it is necessary to obtain a time Tf between the timing t0 at which the transmission wave starts to be transmitted and the timing t3 at which the reflected wave starts to be received. The time Tf can be obtained by subtracting the time ΔT equal to the time Ta as the transmission time of the transmission wave from the time Tp (TOF related to the object O) as a difference between the timing t0 and the timing t4 at which intensity of the reflected wave reaches a peak, exceeding the reflected-wave threshold value Th1.

The timing t0 at which the transmission wave starts to be transmitted can be easily identified as a timing at which the object detection device 11 starts operation, and the time Ta as the transmission time of the transmission wave is predetermined by a setting or the like. Therefore, a distance (object distance) from the transmission and reception source to the object O can be obtained by identifying the timing t4 at which the intensity of the reflected wave reaches the peak, being equal to or greater than the reflected-wave threshold value Th1. The acquisition unit 101 calculates the object distance by, for example, the above-described method.

The ultrasonic wave is affected by an air state (air temperature or humidity) which is a state of air through which the ultrasonic wave propagates. Effects of an air state on the ultrasonic wave will be described below. The following description will be provided assuming that the plurality of transmission and reception units 21A to 21D at the front-end portion of the vehicle body 2 are used as an example of the plurality of transmission and reception units 21, and that the transmission and reception unit 21B is the first transmission and reception unit and the transmission and reception unit 21A is the second transmission and reception unit. Note that each of the transmission and reception units 21A to 21D may be a first transmission and reception unit, and each of the transmission and reception units 21A to 21D may be a second transmission and reception unit. However, in this case, a pair of the first transmission and reception unit and the second transmission and reception unit is a pair of transmission and reception units 21 different from each other. Note that the plurality of transmission and reception units 21 may be the plurality of transmission and reception units 21E to 21H at the rear-end portion of the vehicle body 2.

Figure 5:
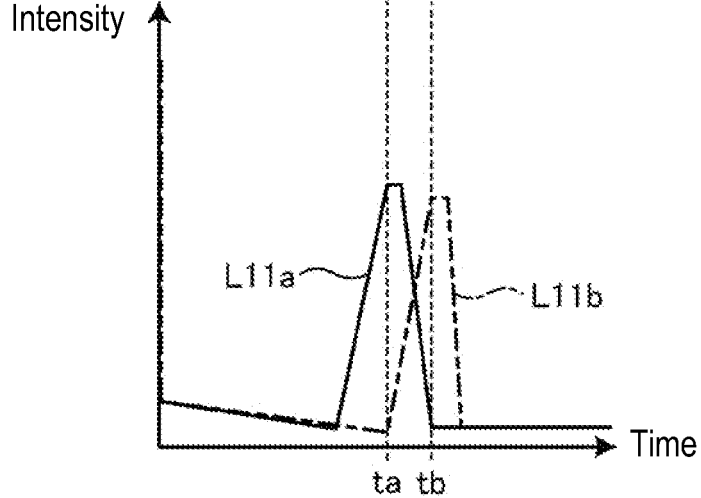
FIG. 5 is a diagram showing a difference in echo information due to a difference in air state in the embodiment.

FIG. 5 is a diagram showing a difference in echo information due to a difference in air state in the embodiment. FIG. 5 exemplifies lines L11*a* and L11*b* as echo information indicating time-course changes in intensity of a direct wave that is an ultrasonic wave transmitted by the transmission and reception unit 21B and directly received by the transmission and reception unit 21A. The line L11*a* indicates echo information of a direct wave in a reference air state, and the line L11*b* indicates echo information of a direct wave in an air state different from the reference air state, specifically, an air state with a humidity higher than a humidity in the reference air state. In the graph shown in FIG. 5, the horizontal axis corresponds to time (TOF), and the vertical axis corresponds to intensity (amplitude value) of an ultrasonic wave received by the transmission and reception unit 21. As shown in FIG. 5, a peak of the intensity of the direct wave on the line L11*a* is a timing ta, and a peak of the intensity of the direct wave on the line L11*b* is a timing tb later than the timing ta. That is, as humidity of air increases, speed of the ultrasonic wave decreases. Here, the line L11*a* indicates a case where the temperature and humidity of the air are 25° C. and 40%, respectively, and the line L11*b* indicates a case where the temperature and humidity of the air are 25° C. and 80%, respectively.

Figure 6:
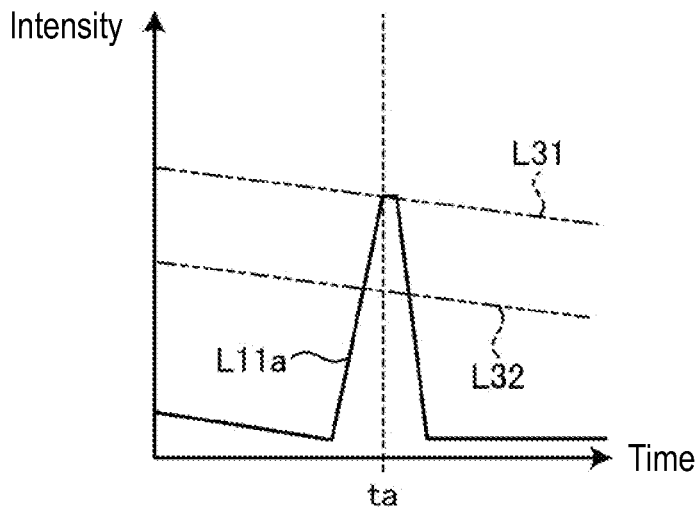
FIG. 6 is a diagram showing an example of echo information in a reference air state in the embodiment.
Figure 7:
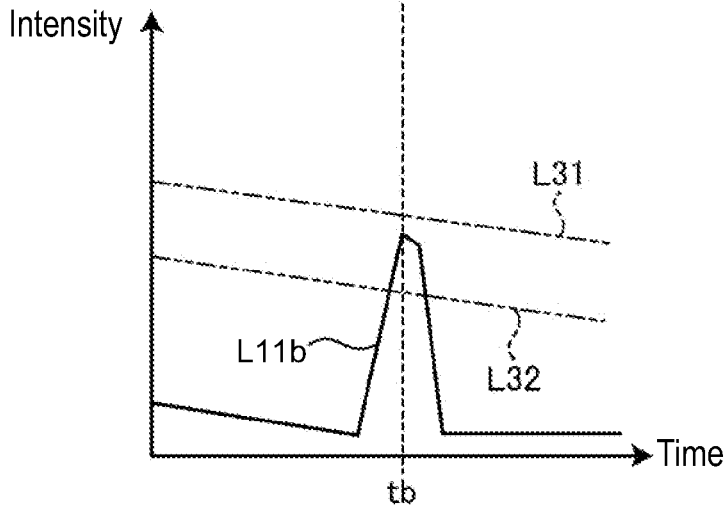
FIG. 7 is a diagram showing an example of echo information in an air state different from the reference air state in the embodiment.

FIG. 6 is a diagram showing an example of echo information in the reference air state in the embodiment. FIG. 7 is a diagram showing an example of echo information in an air state different from the reference air state in the embodiment. FIG. 6 shows reference intensity L31 and a direct-wave threshold value L32 in addition to a line L11*a*, and FIG. 7 shows the reference intensity L31 and the direct-wave threshold value L32 in addition to a line L11*b*. The reference intensity L31 indicates intensity of the direct wave in the reference air state. The direct-wave threshold value L32 is a threshold value for detecting abnormality in a direct wave. As can be seen from FIGS. 6 and 7, a peak value of intensity of the line L11*b* is smaller than a peak value of intensity of the line 11*a*, that is, intensity of the direct wave received by the transmission and reception unit 21A decreases as the humidity of the air increases. The direct-wave threshold value L32 is an example of a second threshold value.

Because the ultrasonic wave is affected by an air state in the present embodiment as described above, the reflected-wave threshold value Th1 is set according to the air state. Specifically, in the present embodiment, the air-absorption attenuation coefficient corresponding to the air state is calculated, and the reflected-wave threshold value Th1 corresponding to the air-absorption attenuation coefficient is set.

Figure 8:
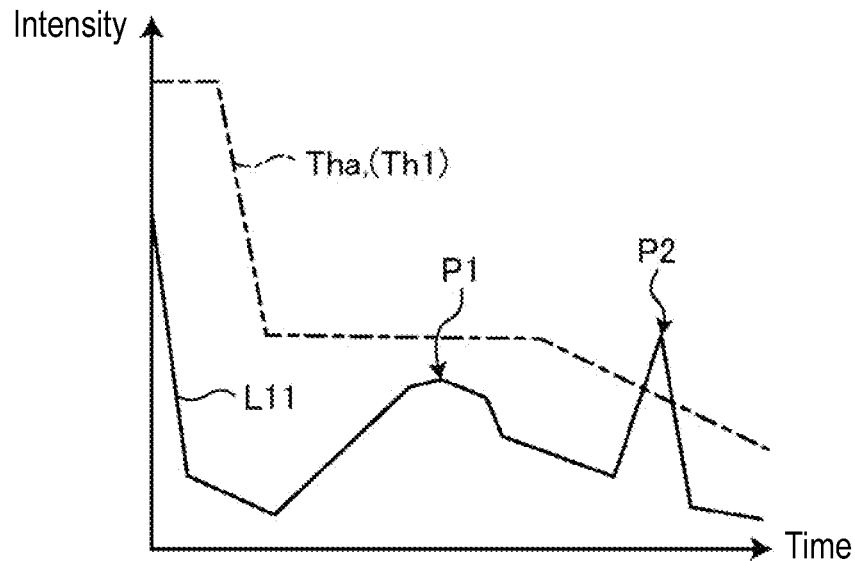
FIG. 8 is a diagram showing an example of echo information and a reflected-wave threshold value in a reference air state, in the embodiment.
Figure 9:
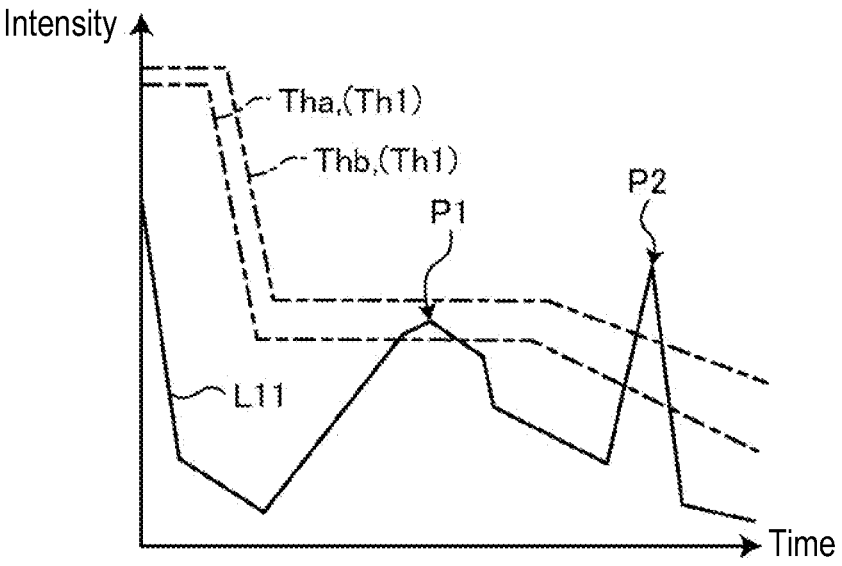
FIG. 9 is a diagram showing an example of echo information and a reflected-wave threshold value in an air state different from the reference air state, in the embodiment.
Figure 10:
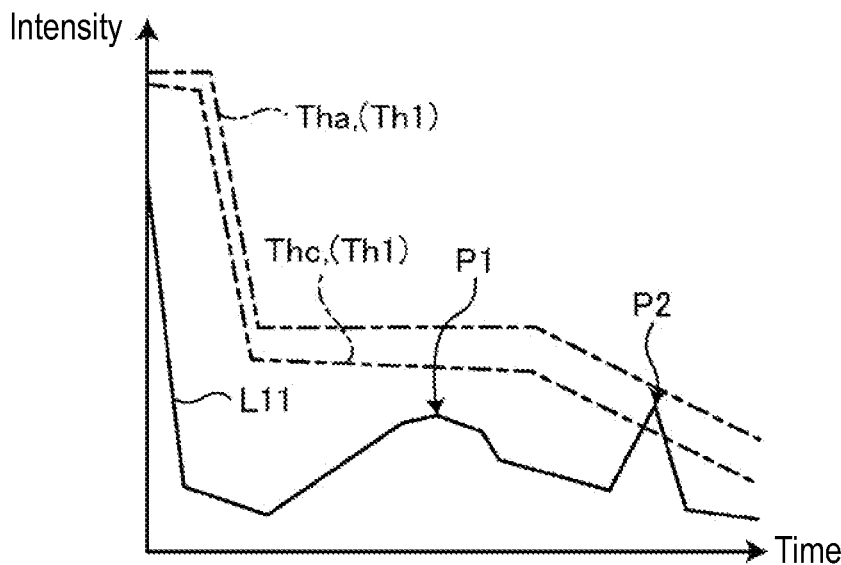
FIG. 10 is a diagram showing an example of echo information and a reflected-wave threshold value in an air state different from the reference air state, in the embodiment.

Here, FIG. 8 is a diagram showing an example of echo information and a reflected-wave threshold value in the reference air state, in the embodiment. FIG. 9 is a diagram showing an example of echo information and a reflected-wave threshold value in an air state different from the reference air state, in the embodiment. FIG. 10 is a diagram showing an example of echo information and a reflected-wave threshold value in an air state different from the reference air state, in the embodiment. Further, FIG. 8 is a diagram in a case where the air-absorption attenuation coefficient is a reference value, FIG. 9 is a diagram in a case where the air-absorption attenuation coefficient is smaller than the reference value, and FIG. 10 is a diagram in a case where the air-absorption attenuation coefficient is larger than the reference value. Further, FIGS. 8 to 10 show reflected-wave threshold values Tha, Thb, and Thc. The reflected-wave threshold value Tha is a reference reflected-wave threshold value Th1, the reflected-wave threshold value Thb is a reflected-wave threshold value Th1 larger than the reflected-wave threshold value Tha, and the reflected-wave threshold value Thc, is a reflected-wave threshold value Th1 smaller than the reflected-wave threshold value Tha. As shown in FIG. 8, in the present embodiment, in a case where an air attenuation coefficient is the reference value, the reference value is used as the reflected-wave threshold value Th1. Further, as shown in FIG. 9, in a case where the air attenuation coefficient is smaller than a reference, the reflected-wave threshold value Thb larger than the reference value is used as the reflected-wave threshold value Th1. Further, as shown in FIG. 10, in a case where the air attenuation coefficient is smaller than the reference, the reflected-wave threshold value Thc smaller than the reference value is used as the reflected-wave threshold value Th1. As a result, in cases of FIGS. 8 to 10, a peak P1 is not determined to be the object O, and a peak P2 is determined to be the object O.

In order to perform the object detection method described above, the acquisition unit 101 and the detection unit 102 perform the following operations.

The acquisition unit 101 acquires direct wave information and reflected-wave information. The direct wave information includes intensity (an amplitude value) of a direct wave at the second transmission and reception unit among the plurality of transmission and reception units 21 that allow transmission and reception of an ultrasonic wave, the direct wave being directly received by the second transmission and reception unit and being an ultrasonic wave transmitted by the first transmission and reception unit among the plurality of transmission and reception units 21. The reflected-wave information includes intensity of a reflected wave obtained by the ultrasonic wave transmitted from the first transmission and reception unit being reflected by an object O, the reflected wave being received on the transmission and reception unit 21.

Figure 11:
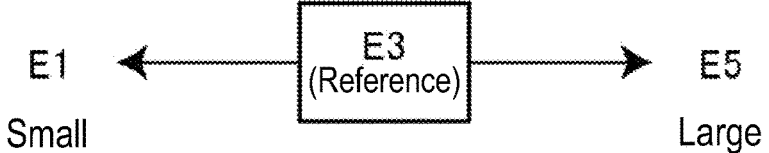
FIG. 11 is a diagram showing an example of air-absorption attenuation coefficient information according to the embodiment.

The detection unit 102 calculates an air-absorption attenuation coefficient of the ultrasonic wave on the basis of the intensity of the direct wave, and detects the object O on the basis of the air-absorption attenuation coefficient and the intensity of the reflected wave. Here, the storage device 42 stores air-absorption attenuation coefficient information. The air-absorption attenuation coefficient information is information indicating an air-absorption attenuation coefficient. Here, FIG. 11 is a diagram showing an example of air-absorption attenuation coefficient information according to the embodiment. As shown in FIG. 11, for example, the air-absorption attenuation coefficient information is a table showing relations between the intensity of the direct wave and the air-absorption attenuation coefficient. As the intensity of the direct wave increases, the air-absorption attenuation coefficient decreases. The detection unit 102 acquires, from the air-absorption attenuation coefficient information, an air-absorption attenuation coefficient corresponding to the intensity of the direct wave. Note that, as another example, the air-absorption attenuation coefficient information may indicate a relation between a difference in intensity from reference intensity that is intensity of a reflected wave in the reference air state, and a correction value of an air-absorption attenuation coefficient with respect to the air-absorption attenuation coefficient in the reference air state, the correction value being corresponding to the difference, and may store an air-absorption attenuation coefficient of an ultrasonic wave in the reference air state. In this case, the detection unit 102 calculates the difference in the intensity from the reflected wave described above, and acquires, from the air-absorption attenuation coefficient information, the correction value of the air-absorption attenuation coefficient corresponding to the calculated difference. Then, the detection unit 102 is only required to use a value obtained by correcting an acquired reference air-absorption attenuation coefficient with the correction value, as the air-absorption attenuation coefficient.

Figure 12:
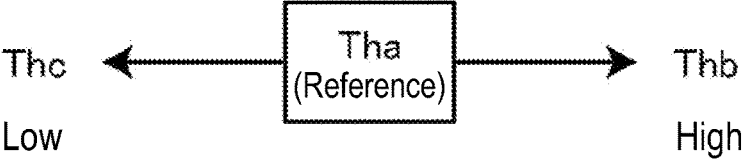
FIG. 12 is a diagram showing an example of reflected-wave threshold value information according to the embodiment.

Further, as shown in FIGS. 8 to 10, the detection unit 102 acquires the reflected-wave threshold value Th1 (first threshold value) corresponding to the air-absorption attenuation coefficient, and, in a case where the intensity of the reflected wave is equal to or greater than the reflected-wave threshold value Th1 (first threshold value), determines that the object O is present. The detection unit 102 determines that the object O is not present in a case where the intensity of the reflected wave is less than the reflected-wave threshold value Th1 (first threshold value) (in a case of the peak P1). Here, the storage device 42 stores the reflected-wave threshold value information. Here, FIG. 12 is a diagram showing an example of the reflected-wave threshold value information according to the embodiment. As shown in FIG. 12, for example, the reflected-wave threshold value information is a table showing relations between the air-absorption attenuation coefficient and the reflected-wave threshold value. As the air-absorption attenuation coefficient increases, the reflected-wave threshold value decreases. The detection unit 102 acquires, from the reflected-wave threshold value information, an air-absorption attenuation coefficient corresponding to the air-absorption attenuation coefficient.

Figure 13:
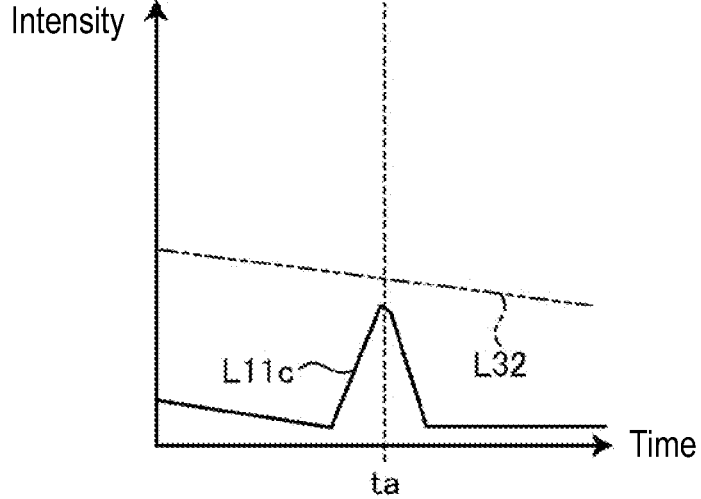
FIG. 13 is a diagram showing an example of echo information in an air state different from the reference air state in the embodiment.

FIG. 13 is a diagram showing an example of echo information in an air state different from the reference air state in the embodiment. As shown in FIG. 13, in a case where the intensity of the direct wave is equal to or less than the direct-wave threshold value L32 (second threshold value), the detection unit 102 does not determine whether or not the object O is present. Note that the direct-wave threshold value L32 is not changed even if the air-absorption attenuation coefficient is changed.

Further, the detection unit 102 calculates sound speed of the direct wave on the basis of a known distance between the first transmission and reception unit and the second transmission and reception unit, and of a time from when the direct wave is transmitted from the first transmission and reception unit to when the direct wave is received by the second transmission and reception unit (arrival time). Here, because sound speed $[\text{m/s}] = (331.5 \pm 0.61) \times$ air temperature, the air temperature can be obtained on the basis of this mathematical formula and the calculated sound speed of the direct wave. The detection unit 102 can obtain humidity of the air with a publicly known method on the basis of the sound speed, the air-absorption attenuation coefficient, and frequency of the direct wave.

Figure 14:
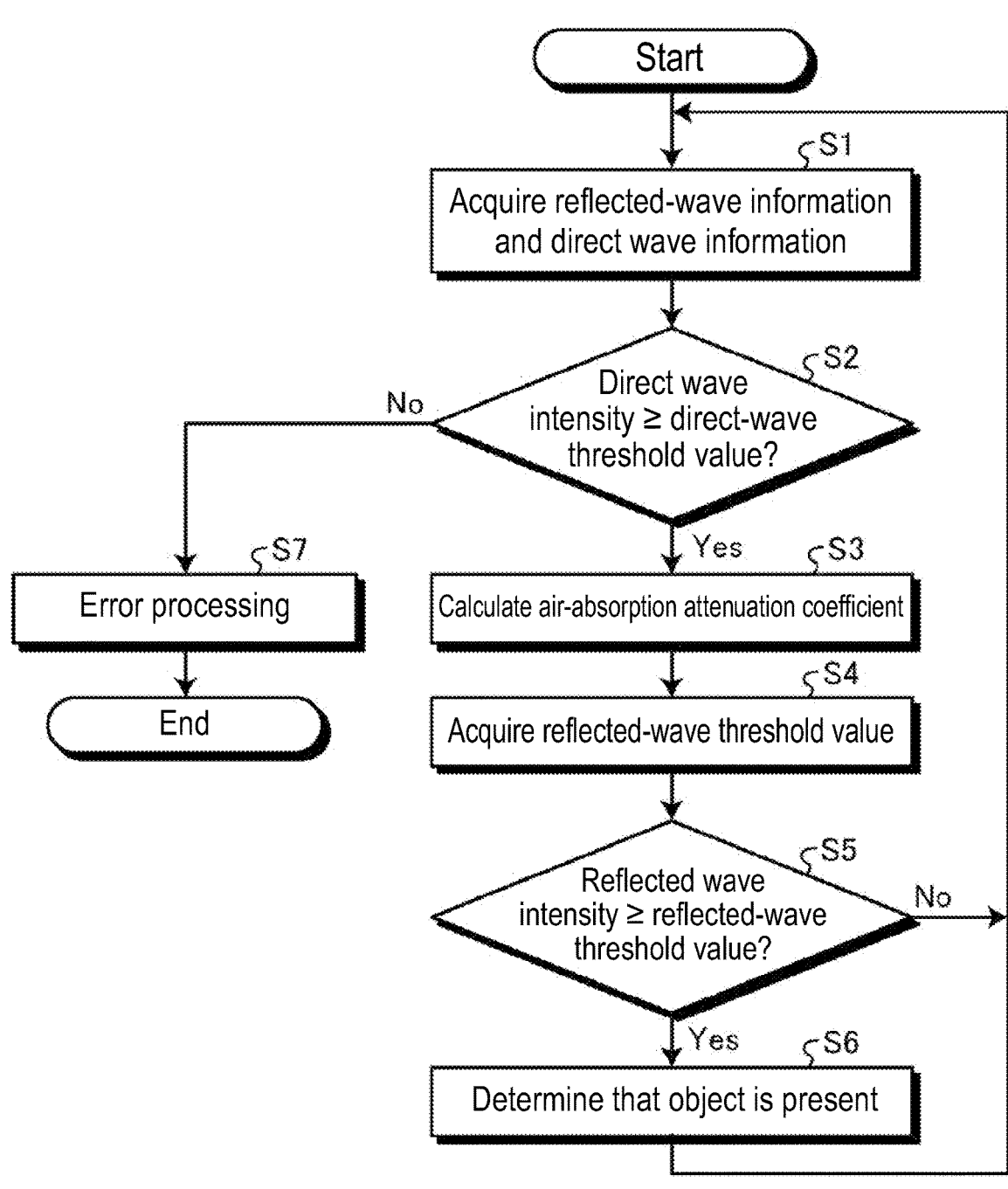
FIG. 14 is a flowchart showing an example of processing (object detection method) executed by the object detection device according to the embodiment.

FIG. 14 is a flowchart showing an example of processing (object detection method) executed by the object detection device 11 according to the embodiment.

The acquisition unit 101 acquires reflected-wave information and direct wave information (S1). Next, the detection unit 102 determines whether or not direct wave intensity, which is intensity of the direct wave, is equal to or greater than a direct-wave threshold value (S2). In a case where the detection unit 102 determines that the direct wave intensity is not equal to or greater than the direct-wave threshold value (S2: No), the detection unit 102 does not determine whether or not the object O is present, and proceeds to S7 to execute error processing. The error processing is, for example, notification of occurrence of abnormality in the transmission and reception unit 21 (transmission and reception of an ultrasonic wave). The abnormality in the transmission and reception unit 21 is, for example, adhesion of a foreign substance (adhering substance) to the transmission and reception unit 21, a decrease in sound pressure, a shift in frequency, or the like.

In a case where the detection unit 102 determines that the direct wave intensity is equal to or greater than the direct-wave threshold value (S2: Yes), the detection unit 102 calculates an air attenuation coefficient (S3). Next, the detection unit 102 acquires a reflected-wave threshold value on the basis of the calculated air attenuation coefficient (S4).

Next, the detection unit 102 determines whether or not the reflected wave intensity is greater than a reflected-wave threshold value (S5). In a case where the reflected wave intensity is greater than the reflected-wave threshold value (S5: Yes), the detection unit 102 determines that the object O is present (S6), and returns to S1. Meanwhile, in a case where the reflected wave intensity is not greater than the reflected-wave threshold value (S5: No), the detection unit 102 does not determine that the object O is present, and returns to S1. The processing in S1 to S6 is repeatedly executed. Note that, in the processing described above, the reflected-wave information and the object distance may be acquired a plurality of times in S1, and an average of the reflected-wave information and the object distance may be used. As a result, accuracy of detecting the object O is further improved.

As described above, the object detection device 11 of the present embodiment includes the acquisition unit 101 and the detection unit 102. The acquisition unit 101 acquires intensity of a direct wave at the second transmission and reception unit among the plurality of transmission and reception units 21 that allow transmission and reception of an ultrasonic wave, the direct wave being directly received by the second transmission and reception unit and being an ultrasonic wave transmitted by the first transmission and reception unit among the plurality of transmission and reception units 21, and intensity of a reflected wave received by a transmission and reception unit 21, the reflected wave being a reflected wave obtained by the ultrasonic wave transmitted from the first transmission and reception unit being reflected on the object O. The detection unit 102 calculates an air-absorption attenuation coefficient of the ultrasonic wave on the basis of the intensity of the direct wave, and detects the object O on the basis of the air-absorption attenuation coefficient and the intensity of the reflected wave.

According to such a configuration, the air-absorption attenuation coefficient of the ultrasonic wave is calculated, and the object O is detected on the basis of the air-absorption attenuation coefficient and the intensity of the reflected wave, allowing accuracy of detection of the object O to be less affected by temperature or humidity of the air. Further, according to such a configuration, it is possible to control the reflected-wave threshold value Th1 corresponding to a reception timing (reception time) of the reflected wave. As a result, it is possible to improve the accuracy in detection of the object O and accuracy in calculation of the object distance, and therefore to reduce unnecessary operation of the vehicle 1. Further, according to such a configuration, the air-absorption attenuation coefficient of the ultrasonic wave can be calculated without changing the transmission and reception unit 21 from a conventional one, an increase in cost of the object detection device 11 can be reduced. Further, according to such a configuration, it is possible to calculate the air-absorption attenuation coefficient of the ultrasonic wave without affecting operation of the transmission and reception unit 21 during an object detection operation by the transmission and reception unit 21.

Further, the detection unit 102 acquires the reflected-wave threshold value Th1 (first threshold value) corresponding to the air-absorption attenuation coefficient, and, in a case where the intensity of the reflected wave is equal to or greater than the reflected-wave threshold value Th1 (first threshold value), determines that the object O is present.

According to such a configuration, the reflected-wave threshold value Th1 is a value corresponding to the air-absorption attenuation coefficient, and thus, the accuracy of detection of the object O is improved as compared with a case where the reflected-wave threshold value Th1 is a fixed value.

Further, the object detection device 11 includes the plurality of transmission and reception units 21. Each of the plurality of transmission and reception units 21 includes a vibrator 31 that performs both transmission of an ultrasonic wave and reception of an ultrasonic wave.

According to such a configuration, the transmission and reception units 21 can be simplified as compared with a configuration in which a vibrator that transmits an ultrasonic wave and a vibrator that receives an ultrasonic wave are separate in the transmission and reception units 21.

Further, the second transmission and reception unit is positioned adjacent to the first transmission and reception unit.

According to such a configuration, a distance between the first transmission and reception unit 21 and the second transmission and reception unit 21 can be relatively short, and thus, a path of a direct wave can be ensured relatively easily.

In a case where intensity of the direct wave is equal to or less than the direct-wave threshold value L32 (second threshold value), the detection unit 102 does not determine whether or not the object O is present. The direct-wave threshold value L32 is not changed even if the air-absorption attenuation coefficient is changed.

According to such a configuration, whether or not the object O is present is not determined in a case where the intensity of the direct wave is equal to or less than the direct-wave threshold value L32, and thus, the object O is not erroneously detected in a case where the intensity of the direct wave is a relatively weak, being equal to or less than the direct-wave threshold value L32.

Next, a first modification will be described. In the first modification, the acquisition unit 101 acquires intensity of a direct wave for each of the plurality of transmission and reception units 21. For example, the acquisition unit 101 acquires intensity of the direct wave for each of a plurality of combinations of two transmission and reception units among the plurality of transmission and reception units 21. Then, the detection unit 102 calculates an average value of the intensities of the plurality of acquired direct waves, and calculates (acquires) an air-absorption attenuation coefficient corresponding to the average value of the intensities from the air-absorption attenuation coefficient information. Further, the detection unit 102 calculates sound speed of each of the plurality of direct waves, and calculates an average value of the plurality of calculated sound speeds.

According to such a configuration, it is possible to reduce chances of occurrence of variations in accuracy in the detection of the object O.

In a second modification, three or more transmission and reception units 21 are provided. The second transmission and reception unit is other than a transmission and reception unit 21 closest to the first transmission and reception unit among the plurality of transmission and reception units 21. As an example, in a case where the first transmission and reception unit is the transmission and reception unit 21B, the second transmission and reception unit is the transmission and reception unit 21D.

According to such a configuration, a distance between the first transmission and reception unit and the second transmission and reception unit is long as compared with a configuration in which the second transmission and reception unit is the transmission and reception unit 21 closest to the first transmission and reception unit among the plurality of transmission and reception units 21, and thus, an effect of air on intensity of a direct wave tends to be greater. Therefore, accuracy in calculation of an air-absorption attenuation coefficient can be improved.

Note that, in the embodiment described above, the plurality of transmission and reception units 21A to 21D and the plurality of transmission and reception units 21E to 21H are disposed symmetrically. Accordingly, a predetermined transmission and reception unit 21 (for example, the transmission and reception unit 21B) may transmit an ultrasonic wave, compare intensities of reflected waves incident from below on a pair of transmission and reception units 21 (for example, the transmission and reception units 21A and 21C) positioned on left and right sides of the predetermined transmission and reception unit 21 and attached at the same height level, and, in a case where there is a difference in intensity at equal to or higher than a predetermined level, determine that an abnormality has occurred in the transmission and reception unit 21.

A program for causing a computer (for example, the processor 43 of the control unit 22, the processor 53 of the ECU 12, or the like) to execute processing for implementing various functions in the embodiment described above can be provided by being recorded in a file in an installable format or an executable format, on a computer-readable recording medium such as a compact disc (CD)-ROM, a flexible disk (FD), a CD-R (recordable), and a digital versatile disk (DVD). Further, the program may be provided or distributed via a network such as the Internet.

The embodiment of the present disclosure have been described above, but the above-described embodiment and modifications thereof are merely examples, and are not intended to limit the scope of the disclosure. The above-described novel embodiment and modifications can be implemented in various forms, and various omissions, substitutions, and modifications may be made without departing from the gist of the disclosure. The above-described embodiment and modifications are included in the scope and gist of the disclosure.

14

REFERENCE SIGNS LIST

1: Vehicle, 11: Object detection device, 21, 21A to 21H: Transmission and reception unit, 101: Acquisition unit, 102: Detection unit, and O: Object

The invention claimed is:

1. An object detection device comprising:
an acquisition unit that acquires intensity of a direct wave at a second transmission and reception unit among a plurality of transmission and reception units that allow transmission and reception of an ultrasonic wave, the direct wave being directly received by the second transmission and reception unit and being an ultrasonic wave transmitted by a first transmission and reception unit among the plurality of transmission and reception units, and intensity of a reflected wave received by the first transmission and reception unit, the reflected wave being a reflected wave that is the ultrasonic wave transmitted from the first the transmission and reception unit being reflected from an object; and
a detection unit that calculates an air-absorption attenuation coefficient using the ultrasonic wave on the basis of the intensity of the direct wave, and detects the object on the basis of the air-absorption attenuation coefficient and the intensity of the reflected wave, wherein
the acquisition unit acquires the intensity of the direct wave for each of the plurality of the transmission and reception units, and
the detection unit calculates an average value of the intensities of a plurality of the direct waves, and calculates the air-absorption attenuation coefficient on the basis of the average value.

2. The object detection device according to claim 1, wherein
the detection unit acquires a first threshold value corresponding to the air-absorption attenuation coefficient, and, in a case where the intensity of the reflected wave is equal to or greater than the first threshold value, determines that the object is present.

3. The object detection device according to claim 2, wherein the first threshold value corresponding to the air-absorption attenuation coefficient is set in such a manner that the first threshold is smaller at a time when the transmission of the ultrasonic wave is completed than at a time when the transmission of the ultrasonic wave is started.

4. The object detection device according to claim 1, further comprising the plurality of the transmission and reception units, wherein
each of the plurality of the transmission and reception units includes a vibrator that performs both transmission of the ultrasonic wave and reception of the ultrasonic wave.

5. The object detection device according to claim 1, wherein
the second transmission and reception unit is positioned adjacent to the first the transmission and reception unit.

6. The object detection device according to claim 1, wherein
three or more transmission and reception units are provided, and
the second transmission and reception unit is other than the transmission and reception unit closest to the first the transmission and reception unit among the plurality of the transmission and reception units.

7. An object detection device comprising:

an acquisition unit that acquires intensity of a direct wave at a second transmission and reception unit among a plurality of transmission and reception units that allow transmission and reception of an ultrasonic wave, the direct wave being directly received by the second transmission and reception unit and being an ultrasonic wave transmitted by a first transmission and reception unit among the plurality of transmission and reception units, and intensity of a reflected wave received by the first transmission and reception unit, the reflected wave being a reflected wave that is the ultrasonic wave transmitted from the first the transmission and reception unit being reflected from an object; and a detection unit that calculates an air-absorption attenuation coefficient using the ultrasonic wave on the basis of the intensity of the direct wave, and detects the object on the basis of the air-absorption attenuation coefficient and the intensity of the reflected wave, wherein in a case where the intensity of the direct wave is equal to or less than a second threshold value, the detection unit does not determine whether or not the object is present, and the second threshold value is not changed even if the air-absorption attenuation coefficient is changed.

8. An object detection method executed in an object detection device, the object detection method comprising:

a step of acquiring intensity of a direct wave at a second transmission and reception unit among a plurality of transmission and reception units that allow transmission and reception of an ultrasonic wave, the direct wave being directly received by the second transmission and reception unit and being an ultrasonic wave transmitted by a first transmission and reception unit among the plurality of transmission and reception units, and intensity of a reflected wave received by the first transmission and reception unit, the reflected wave being a reflected wave that is the ultrasonic wave transmitted from the first the transmission and reception unit being reflected from an object; and a step of calculating an air-absorption attenuation coefficient using the ultrasonic wave on the basis of the intensity of the direct wave, and detecting the object on the basis of the air-absorption attenuation coefficient and the intensity of the reflected wave, wherein the step of acquiring acquires the intensity of the direct wave for each of the plurality of the transmission and reception units, and the step of calculating calculates an average value of the intensities of a plurality of the direct waves, and calculates the air-absorption attenuation coefficient on the basis of the average value.

9. A program stored on a non-transitory computer readable medium that causes a computer to function as an acquisition unit that acquires intensity of a direct wave at a second transmission and reception unit among a plurality of transmission and reception units that allow transmission and reception of an ultrasonic wave, the direct wave being directly received by the second transmission and reception unit and being an ultrasonic wave transmitted by a first transmission and reception unit among the plurality of transmission and reception units, and intensity of the reflected wave received by the first transmission and reception unit, the reflected wave being a reflected wave that is the ultrasonic wave transmitted from the first the transmission and reception unit being reflected from an object, and a detection unit that calculates an air-absorption attenuation coefficient using the ultrasonic wave on the basis of the intensity of the direct wave, and detects the object on the basis of the air-absorption attenuation coefficient and the intensity of the reflected wave, wherein the acquisition unit acquires the intensity of the direct wave for each of the plurality of the transmission and reception units, and the detection unit calculates an average value of the intensities of a plurality of the direct waves, and calculates the air-absorption attenuation coefficient on the basis of the average value.

* * * * *